(12) United States Patent
Shulman et al.

(10) Patent No.: US 8,135,948 B2
(45) Date of Patent: Mar. 13, 2012

(54) METHOD AND SYSTEM FOR TRANSPARENTLY ENCRYPTING SENSITIVE INFORMATION

(75) Inventors: Amichai Shulman, Givataim (IL); Shlomo Kramer, Tel-Aviv (IL)

(73) Assignee: Imperva, Inc., Ramat-Gan (IL)

( * ) Notice: Subject to any disclaimer, the term of this patent is extended or adjusted under 35 U.S.C. 154(b) by 1345 days.

(21) Appl. No.: 11/698,976

(22) Filed: Jan. 29, 2007

(65) Prior Publication Data

US 2007/0294539 A1 Dec. 20, 2007

Related U.S. Application Data

(60) Provisional application No. 60/762,520, filed on Jan. 27, 2006.

(51) Int. Cl.
*H04L 29/06* (2006.01)
(52) U.S. Cl. ......... 713/153; 713/193
(58) Field of Classification Search ......... 713/165, 713/167, 186, 189, 193; 726/26
See application file for complete search history.

(56) References Cited

U.S. PATENT DOCUMENTS

| | | | |
|---|---|---|---|
| 5,442,699 A | 8/1995 | Arnold et al. | |
| 6,360,324 B2 | 3/2002 | Van Blarkom | |
| 6,584,505 B1 * | 6/2003 | Howard et al. | 709/225 |
| 6,968,456 B1 | 11/2005 | Tripathi et al. | |
| 6,981,141 B1 | 12/2005 | Mahne et al. | |
| 7,260,215 B2 * | 8/2007 | Troyansky et al. | 380/28 |
| 7,639,819 B2 * | 12/2009 | Ho et al. | 380/277 |
| 2001/0029582 A1 * | 10/2001 | Goodman et al. | 713/193 |
| 2002/0078049 A1 * | 6/2002 | Samar | 707/9 |
| 2002/0131599 A1 * | 9/2002 | Mullen et al. | 380/270 |
| 2004/0193905 A1 * | 9/2004 | Lirov et al. | 713/193 |
| 2004/0230792 A1 | 11/2004 | McCarty | |
| 2004/0255133 A1 | 12/2004 | Lei et al. | |
| 2005/0044366 A1 | 2/2005 | Pucheral et al. | |
| 2006/0005017 A1 * | 1/2006 | Black et al. | 713/165 |
| 2006/0210071 A1 * | 9/2006 | Chandran et al. | 380/42 |

OTHER PUBLICATIONS

Gartner IT Security Summit, Imperva Delivers First True Gigabit Application Firewall Solution, News & Events, Press Release, http://web.archive.org/web/20060312094936/www.imperva.com/company/news/2005-jun-06.html, Imperva Inc., Jun. 6, 2005, pp. 3, Washington, DC, USA.
Imperva SecureSpehre™ Data Security Solutions, Products, SecureSpere, http://web.archive.org/web/20060312093140/www.imperva.com/products/securesphere/, Imperva Inc, 2006, p. 1.
Imperva Inc., SecureSpehre™ Web Application Firewall the Industry's Only Automated Web Application Firewall, Products, Resources, Database, SecureSphere Web Application Firewall Datasheet, http://web.archive.org/web/20060312092739/www.imperva.com/products/securesphere/resources.asp, 2006, pp. 4.
Imperva Inc., Imperva SecureSpehre™ Dynamic Profiling Firewall, Product, SecureSphere, http://web.archive.org/web/20050207181514/www.imperva.com/products/securesphere/, 2005, pp. 2.

(Continued)

*Primary Examiner* — Gilberto Barron, Jr.
*Assistant Examiner* — David Le
(74) *Attorney, Agent, or Firm* — Sughrue Mion, PLLC (57) ABSTRACT

A method for transparently encrypting sensitive information, comprising detecting at least one literal in a database command that includes sensitive information. The literal is extracted from the database command. The literal is encrypted thereby forming an encrypted string. The literal is replaced by the encrypted string in the database command.

45 Claims, 5 Drawing Sheets

OTHER PUBLICATIONS

Imperva Inc., Imperva Delivers Unique Security Insight into Applications in Production, News & Events, Press Releases, New Release of SecureSphere Extends the Reach of Innovative Dynamic Profiling Technology, http://web.archive.org/web/20050207165342/www.imperva.com/company/news/2004-dec-13.html, Dec. 13, 2004, pp. 3, Foster City, California, USA.

Imperva Inc., Web and Database Firewalls, Products, SecureSpereυ, Dynamic Profiling, http://web.archive.org/web/20041224083525/www.imperva.com/products/securesphere/web_database_firewalls.html, 2004, pp. 2.

Imperva Inc., Ready to take a test drive?, Products, SecureSpere™, Demo, http://web.archive.org/web/20041224085514/www.imperva.com/products/securesphere/demo.html, 2005, pp. 2.

Imperva Inc., Freeware IT security test tools, Application Defense Center, tools, http://web.archive.org/web/20041223174325/www.imperva.com/application_defense_center/tools.asp, 2005, p. 1.

Imperva Inc., Products, SecureSpehre™, White Papers, http://web.archive.org/web/20041224085413/www.imperva.com/products/securesphere/white_papers.asp, 2005, pp. 2.

Imperva Inc., Traditional Web Application Security vs. SecureSphere, A comparison of Hard Trigger Rules vs. Correlated Attack Validation, 2004, pp. 10.

Imperva Inc., Imperva™ SecureSphere™ Technical Description, 2004, pp. 20.

Imperva Inc., Imperva Unveils Next Generation Firewall Technology: Dynamic Profiling, SecureSphere 3.0 Delivers Total Application Security from Web, Worm and Database Threats, About Us, Press Releases, http://web.archive.org/web/20041015225044/www.imperva.com/company/news/2004-aug-23.html, Aug. 23, 2004, pp. 2, Foster City, California, USA.

Imperva Inc., Management & Reporting, http://web.archive.org/web/20041023204255/www.imperva.com/products/securesphere/management_reporting.html, Sep. 26, 2004, p. 1, vol. 3.0.

Imperva Inc., Imperva™ SecureSphere™ Securing the Enterprise Application Sphere, Apr. 1, 2004, pp. 2, vol. 2.0.

Imperva Inc., SecureSphere™ Dynamic Profiling Firewall Total Application Security, Products, SecureSphere™, Database, SecureSphere Datasheet, http://web.archive.org/web/20041215173241/www.imperva.com/products/securesphere/datasheet.html, 2004, pp. 4.

Imperva Inc., SecureSphere™ Dynamic Profiling Firewall Total Application Security, 2004, pp. 4.

Imperva Inc., Total Application Security with the SecureSphere Dynamic Profiling Firewall, http://www.infotechits.com/IT_Solutions/SecureSphere/securesphere_white_paper.pdf, 2004, pp. 1-10.

* cited by examiner

METHOD AND SYSTEM FOR TRANSPARENTLY ENCRYPTING SENSITIVE INFORMATION

CROSS REFERENCE TO RELATED APPLICATIONS

This application claims priority from U.S. provisional application No. 60/762,250 filed on Jan. 27, 2006 which is incorporated by reference, herein, in its entirety.

BACKGROUND

1. Technical Field

The present invention relates generally to the securing of database systems, and more particularly to the securing of data-at-rest in database systems.

REFERENCES

The following U.S. patents and publications provide useful background information, for which they are incorporated herein by reference in their entirety.

| | | |
|---|---|---|
| 5,442,699 | August 1995 | Arnold, et al. |
| 6,360,324 | March 2002 | Van Blarkom |
| 6,968,456 | November 2005 | Tripathi, et al. |
| 6,981,141 | December 2005 | Mahne, et al. |
| 20040230792 | November 2004 | McCarty |
| 20040255133 | December 2004 | Lei, et al. |
| 20050044366 | February 2005 | Pucheral, et al. |

Security of data in relational database systems (or databases) is an important feature that is frequently achieved by encrypting data within the database systems. That is, information or more practically, sensitive information (e.g., passwords, credit card numbers, social security numbers, etc.) is kept encrypted while at-rest. Currently, there are two primary approaches for encrypting data stored in databases. The first approach performs cryptographic operations on entire database files, while the second approach selectively applies cryptographic operations to specific sensitive data within a database.

The encryption of the entire database is used when sensitive data may be stored outside a particular table in other database objects. The selective approach includes the encryption of only sensitive columns within the database. This is typically done in order to reduce the overhead involved in performing cryptographic operations.

Unlike personal encryption mechanisms in which each and every user has a unique encryption and decryption key, database encryption requires the use of a shared key between all processes that access the information. One of the hardest problems of encrypting data-at-rest is the storage and security of the encryption key. To efficiently secure the information, the keys must not reside on the protected storage media. Consequently, encrypting information in the database servers where the keys are stored does not provide a secured solution.

An example for a system that encrypts sensitive data may be found in U.S. patent application Ser. No. 10/459,811 titled "Method and apparatus for encrypting database columns" which is incorporated herein by reference for its useful background information. The '811 application discloses a system that facilitates encryption of data within a column of a database. The system operates by first receiving a command to perform a database operation. Next, the system parses the command to create a parse tree. The system then examines the parse tree to determine if a column referenced in the parse tree is an encrypted column. If a column referenced in the parse tree is an encrypted column, the system automatically transforms the command to include one or more cryptographic commands to facilitate accessing the encrypted column while performing the database operation. The drawback of this system is that sensitive data cannot be protected from users or through administrator permissions. Moreover, encryption is based on a policy attached to the column name rather to the notion of sensitive information per-se.

Another technique for encrypting sensitive information may be found in U.S. patent application Ser. No. 10/422,667 titled "Methods and systems for transparent data encryption and decryption" which is incorporated herein by reference for its useful background information. The '667 application provides a method and system for transparently encrypting (and decrypting) sensitive data stored in a directory. When a directory entry is created, the sensitive data received from a client is encrypted and saved in the directory entry in encrypted form. Encryption of sensitive data is performed in accordance with a predetermined set of policies. When the sensitive information is needed, it may be selectively delivered in encrypted or unencrypted form based on a policy in the set.

The drawbacks of the '667 application is that data between clients and directory must be constructed in accordance with a tagged protocol, such as lightweight directory access (LDAP) protocol, an extensible markup language (XML) protocol and the like. In addition, the conversion from a clear text to a ciphered text changes the text's size. As a result, the system of '667 cannot be applicable for relational databases that implement logical structure in the way that they store data.

It would be therefore advantageous to provide a security solution that overcomes the drawbacks of prior art solutions when securing sensitive information kept in relational database systems.

SUMMARY

To realize some of the advantages described above there is provided a method for transparently encrypting sensitive information, comprising detecting at least one literal in a database command that includes sensitive information. The literal is extracted from the database command. The literal is encrypted thereby forming an encrypted string. The literal is replaced by the encrypted string in the database command.

In another specific enhancement the method further comprises sending the database command with the encrypted literal to a database server.

More specifically, the database command is sent from a client to a database server over network.

In another specific enhancement the network comprises at least one of a wide area network (WAN) and a local area network (LAN).

In another specific enhancement, the database command comprises at least one of executing a database query; preparing a SQL statement; executing a prepared SQL statement; declaring a database cursor; opening a database cursor; and executing a database stored procedure.

In another specific enhancement, the encryption is done using a size preserving encryption scheme that ensures that the encrypted literal's size is exactly as a size of the extracted literal.

More specifically, encrypting the literal comprises forming an encrypted field having a same size as the size of the execrated literal. A sensitive stream is constructed. The sensitive stream is encrypted using a block cipher algorithm.

More specifically, the encrypted field comprises a start sentinel cell, a sensitive information pattern identifier cell, a text length cell, and a cipher text cell.

More specifically, the sensitive stream comprises: a random number, a compressed value corresponding to the extracted literal, padding bits, and a checksum value.

More specifically, the compressed value is generated by mapping characters of the extracted literal to a shortest available fixed-size bit representation using a character conversion table of the sensitive information pattern.

More specifically, the block cipher algorithm comprises at least one of data encryption standard and an advanced encryption standard.

In another specific enhancement, the encryption of sensitive information is performed inline.

Another aspect of the disclosed teachings is a method for transparently decrypting sensitive information, comprising for each encrypted string included in data retrieved from a database checking against a predefined policy if a client requesting the data is authorized to view sensitive information contained in the data. The encrypted string is decrypted to construct the sensitive information if the client is authorized to view the sensitive information. The constructed sensitive information is sent to the client.

In another specific enhancement the method further comprises blocking a connection with the client, if the client is unauthorized to view the sensitive information.

More specifically, the predefined policy determines at least the information and attributes that the client is authorized to view.

More specifically, the encrypted string comprises an encrypted field.

More specifically, the encrypted field includes a start sentinel cell, a sensitive information pattern identifier cell, a text length cell, and a ciphered text cell.

More specifically, decrypting the encrypted string further comprises identifying the start sentinel cell in the encrypted stream. A value of the text length cell is obtained. The text length's value is compared to a length of a ciphered text in the ciphered text cell. The ciphered text is decrypted.

More specifically, the method further comprises extracting the sensitive information pattern identifier from the sensitive information pattern identifier cell and decoding the unencrypted text according to the character conversion table corresponding to the sensitive information pattern.

Computer program products including a computer readable medium having software instructions to enable a computer to implement the above techniques are also within the scope of the disclosed teachings.

Another aspect of the disclosed teachings is a secure database system, comprising a database server for servicing requests from clients for computational or data storage resources. A database is coupled to the database server and is capable of saving sensitive information. An encryption gateway is installed between the clients and the database server and is capable of performing transparent encrypting.

BRIEF DESCRIPTION OF THE DRAWINGS

The above objectives and advantages of the disclosed teachings will become more apparent by describing in detail preferred embodiments thereof with reference to the attached drawings in which.

DETAILED DESCRIPTION

A method and system for encrypting and decrypting sensitive information as it flows between clients to a relational database server are provided. The system decrypts the sensitive information only if a client is authorized to view the information. Therefore, the present invention ensures that sensitive information is received at the database server in its encrypted form and is stored as such to persistent media. Furthermore, the sensitive information is retrieved from the database in its encrypted form and is transmitted as such to a requesting client.

Figure 1:
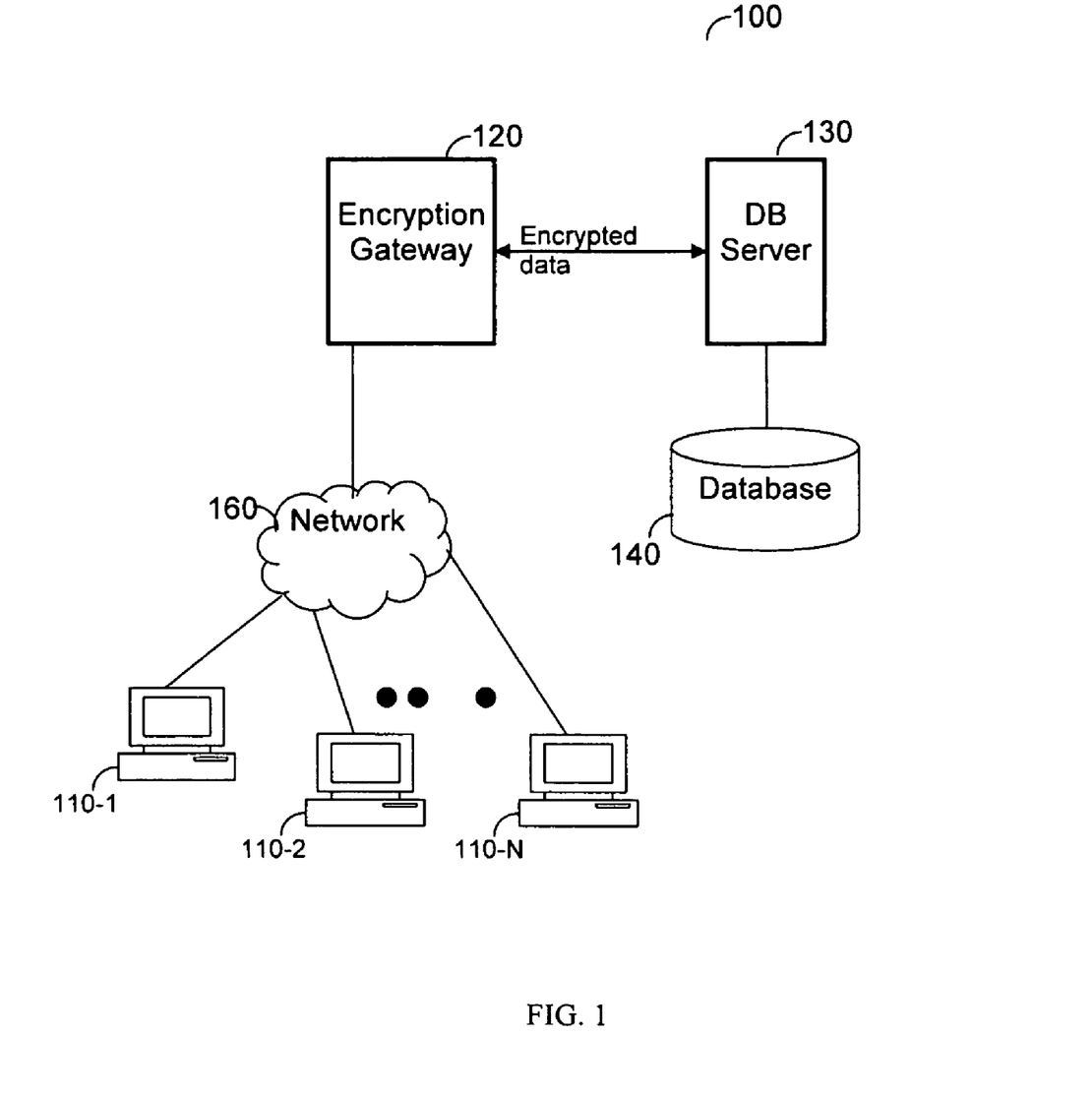
FIG. 1—is a block diagram of an exemplary secure database system used to describe aspects of the present invention.

FIG. 1 shows an exemplary and non-limiting block diagram of a secure database system 100 used to demonstrate the principles of the present invention. System 100 includes a plurality of clients 110-1 through 110-N, an encryption gateway 120, a database (DB) server 130, and a database 140. A client 110 (for example 110-1) submits structured query language (SQL) queries to DB server 130 through a network 160, such as a local area network (LAN) or a wide area network (WAN). Henceforth 110 is used to refer to any one of the plurality of clients 110-1-110-N.

DB server 130 may be any computational node including a mechanism for servicing requests from a client 110 for computational or data storage resources. For example, DB server 130 may be one of Oracle Database Server, Microsoft SQL server, DB2, and the likes. Database 140 may include any type of non-volatile storage and is directly coupled to DB server 130.

Encryption gateway 120 is placed on a network segment between clients 110 and DB server 130. Encryption gateway 120 collects and analyzes SQL queries sent from clients 110 and data sent back from DB server. This is performed to allow inline and transparent encrypting and decrypting of sensitive information. Specifically, encryption gateway 120 is designed to encrypt sensitive information as it flows from clients 110 to DB server 130. As a result, sensitive information arrives at DB server 130 as ciphered text and is stored as such in database 140. Sensitive information is also sent from database 140 in its encrypted form on its way to a requesting client 110, and thus an attacker having access to DB server 130 cannot access this information.

Sensitive information retrieved by client 110 is decrypted by encryption gateway 120 only if a user of the client is allowed to view such sensitive information. If a client 110 is not authorized, encryption gateway 120 may block the connection or deliver the encrypted information as is. The permission level of each client 110 to view to the data is determined according to policies defined in encryption gateway 120. That is, the mechanism that controls the access to the decrypted information is not controlled by the system administrators, and thus administrators cannot view or change the sensitive information. Nevertheless, encryption gateway 120 allows system administrators to perform any required maintenance operations on DB server 130 and database 140 without being exposed to the sensitive information.

Figure 2:
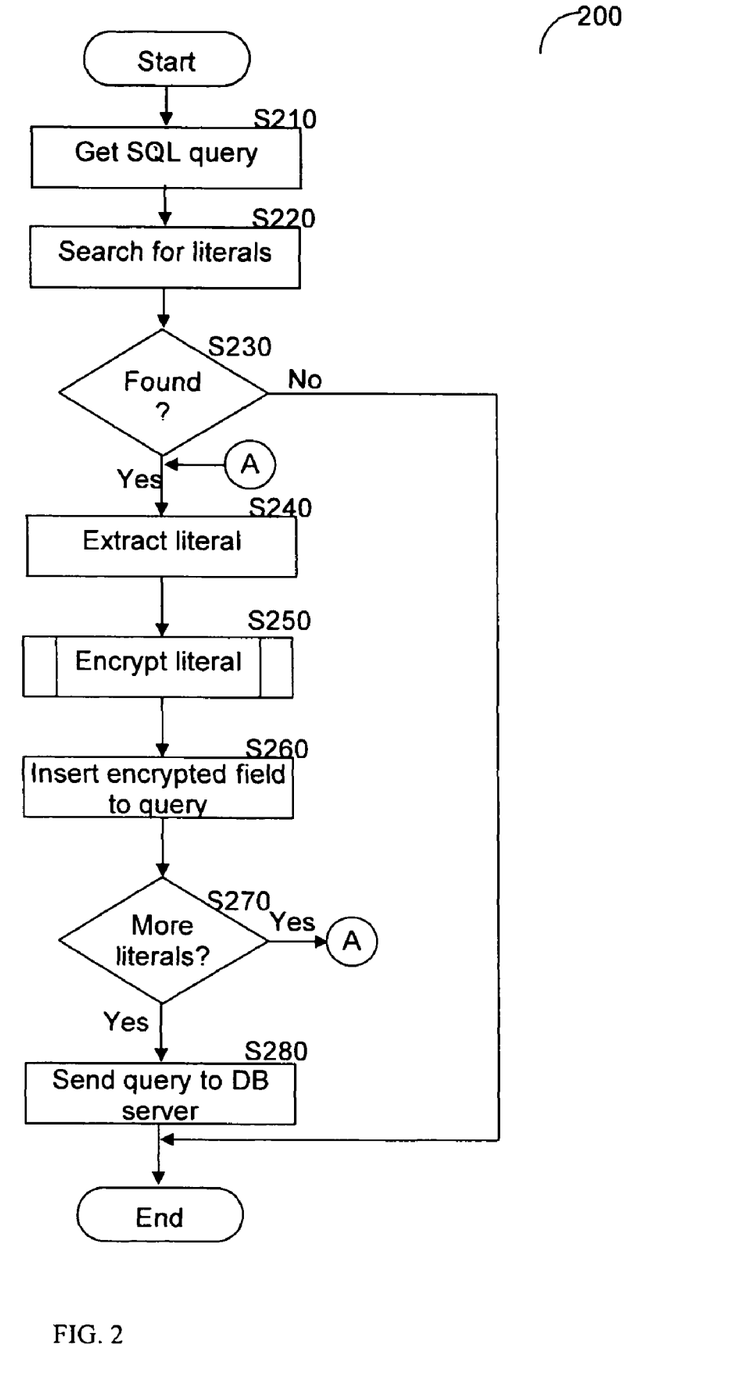
FIG. 2—is a flowchart describing the method for transparently encrypting sensitive information in accordance with one exemplary embodiment of the present invention.

FIG. 2 shows an exemplary and non-limiting flowchart 200 describing the method for transparently encrypting sensitive information in accordance with one embodiment of the present invention. At S210, a SQL query sent from a client 110 to DB server 130 is received at encryption gateway 120. At S220, the incoming query is scanned to detect if it includes one or more literals that are considered as sensitive information. For example, for the SQL query statement:

"select first_name from table_1 where credit_card_no=12345"

the literal is the number 12345. In one embodiment of the present invention, the method searches for patterns that represent literals using regular expressions that encryption gateway 120 is preconfigured with. In other exemplary embodiments, advanced detection methods can be utilized to identify information, such as social security number (SSN), Credit Card Numbers (CCN), account numbers, and so on. Therefore, the encryption technique disclosed herein is based on the content and context of the information rather than its name, location or otherwise external identifications. At S230, a check is made to determine if at least one literal that matches to a definition of a regular expression was found, and if so execution continues at S240; otherwise, execution terminates. At S240, the literal is extracted from the query and subsequently, at S250, the literal is encrypted using a size preserving encryption scheme, and thereby forming an encrypted string.

Figure 3:
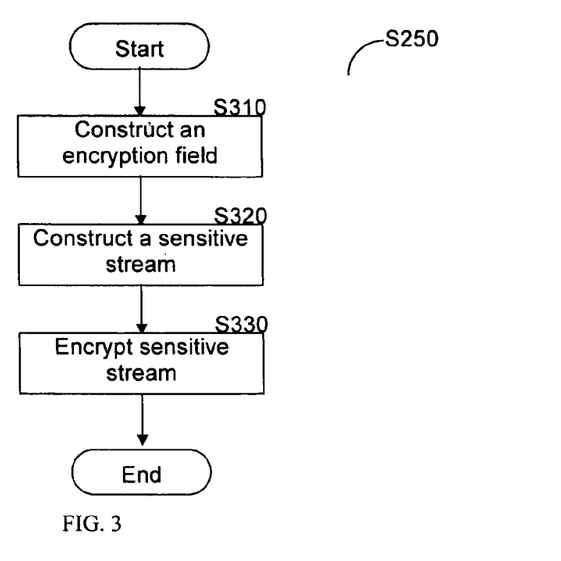
FIG. 3—is a flowchart describing the execution of the size preserving encryption scheme in accordance with one exemplary embodiment of the present invention.
Figure 4A:
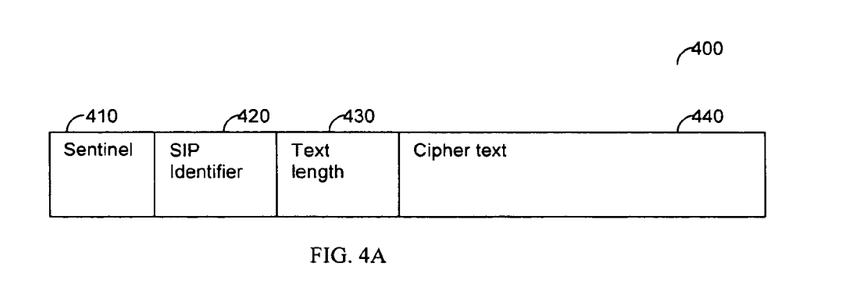
FIG. 4—is a schematic representation of an encrypted field structure according to an exemplary embodiment.

FIG. 3 shows the execution of the S250 in greater detail. The size preserving encryption scheme ensures that the size of the ciphered text is identical to the size of the original literal. In addition, in order to detect encrypted strings in the data retrieved from database 140, the ciphered text contains enough redundancy that allows its positive identification. Thus, decryption policy is completely independent of encryption policy. The size preserving encryption scheme uses a character conversion table (CCT) to map allowed characters of a sensitive information pattern (SIP) to the shortest available fixed-size bit representation. For example, if the allowed characters for a given SIP include only numeric characters then the CCT is a binary coded decimal (BCD) code. A SIP is a definition of a class of sensitive data, including a definition of allowed characters, their order and any other logic that may positively identify data items as being part of this class. At S310, an encrypted field structure is formed. The size of this structure equals to the size, in bytes, of the literal extracted in step S240. FIG. 4A provides an exemplary diagram of an encrypted field structure 400 that comprises a start sentinel cell 410, a SIP identifier cell 420, a text length cell 430, and a cipher text cell 440. The value of the start sentinel is constant, e.g., 0xFEFE.

Figure 4B:
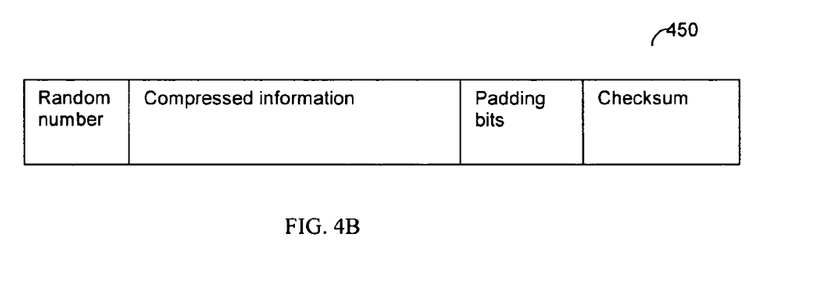

At S320, a sensitive stream is constructed. As shown in FIG. 4B, the sensitive stream 450 is composed of a random number, compressed information, padding bits, and a checksum. Each nibble, i.e., four bits, in the compressed information represents a character from the original literal encoded according to the CCT of the SIP. For example, if the CCT is a BCD code, the compressed information representation of the credit_card_no literal "12345" shown above would be: 0001|0010|0011|0100|0101. The padding bits include constant binary values and the checksum is computed over the random number, compressed information and padding bits. At S330, the sensitive stream is encrypted using a chosen block cipher, e.g., DES or AES, and thereby generating the ciphered text to be placed in cell 440. The keys used for the encryption of the sensitive stream are saved in gateway 120 and may be further kept in a secured backup storage. It should be noted that the encryption gateway 120 can be configured to omit the random number (salt), and thus allowing comparison of encrypted values.

Referring back to FIG. 2, step S260, the original literal is replaced by the encrypted string in the incoming query. At S270, a check is made to determine if all literals detected at S220 were handled, and if so execution proceeds to S280; otherwise execution returns to S240, At S280 the query, including the encrypted sensitive information, is relayed to DB server 130.

Figure 5:
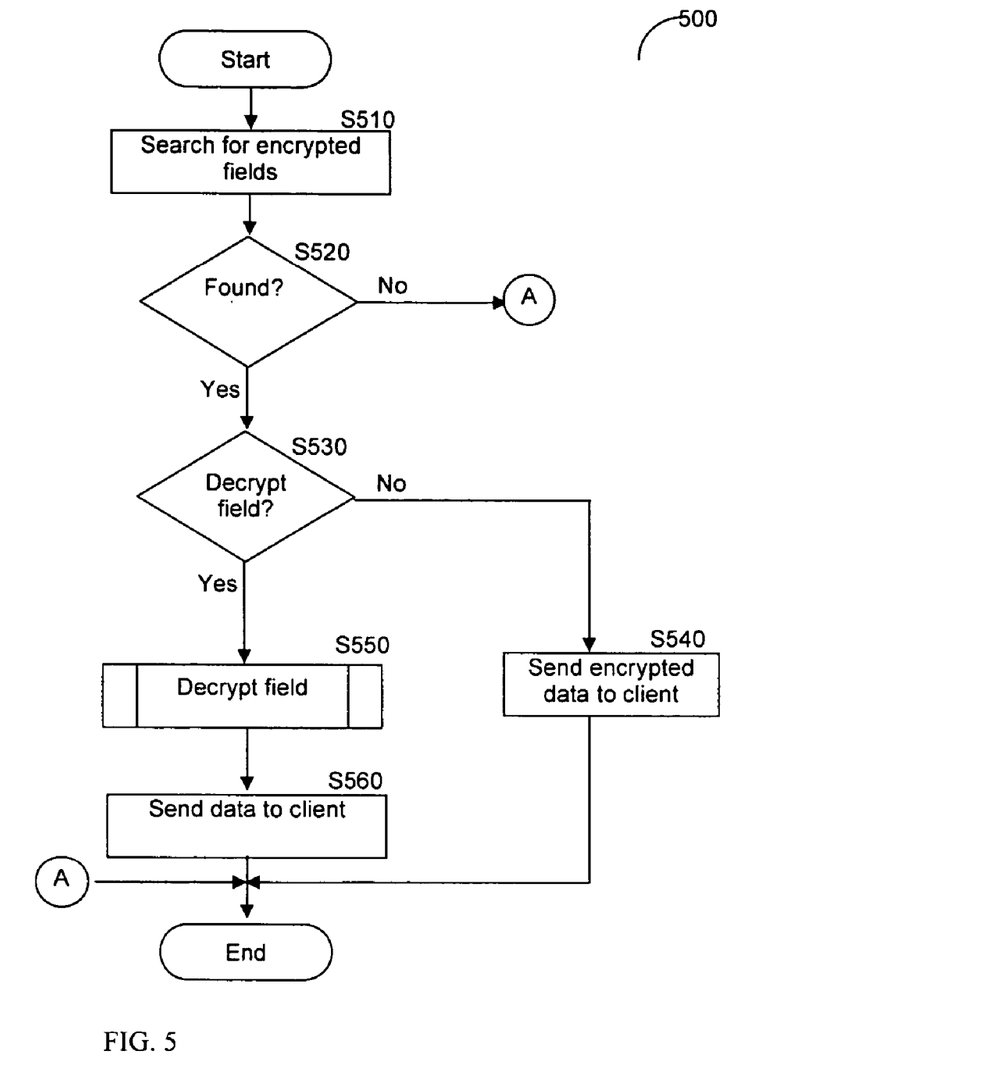
FIG. 5—is a flowchart describing the method for transparently decrypting sensitive information in accordance with one exemplary embodiment of the present invention.

FIG. 5 shows a non-limiting and exemplary flowchart 500 describing the method for decrypting sensitive information in accordance with one embodiment of the present invention. The sensitive information is decrypted as it flows from DB server 130 to client 110 and only if the client is authorized to view the information. The method is configured to detect an encrypted field (e.g., field 400) in data traffic sent form DB server 130. In step S520, a check is performed to determine if such field was found, and if so execution continues with step S530; otherwise, execution ends. In step S530, another check takes place to determine if a client 110 to which the connection belongs to is permitted to view the sensitive information. For each client 110, a policy is defined that specifies which attributes and information type a client may view. This is opposed to related art solutions where the content to which a client is exposed is defined using external tagging. For example, a user may view only his credit card number and personal identification number (PIN), whereas a security manager may view the PINs and credit card numbers of all user registered in database 140. If step S530 results with a negative answer, execution proceeds to step S540 where the encrypted data is sent to the requesting client; otherwise, execution continues with step S550. It should be noted that if the requesting client is not allowed to view the information, then the connection between the client and the DB server may be blocked.

In step S550, the detected encryption field is decrypted and verified. Specifically, if the encryption field has the same structure as field 400, then the following steps are taken: a) start sentinel cell 410 is identified; b) the value of text length cell 430 is obtained and compared to a known length of the ciphered text; c) the value of the ciphered text cell 440 is read and decrypted; d) the unencrypted text is verified against the value of the checksum; e) the SIP identifier is extracted from cell 420; and, f) the unencrypted text is decoded according to the CCT table corresponding to the SIP. At S560, the decrypted sensitive information is relayed to the client.

Figure 6:
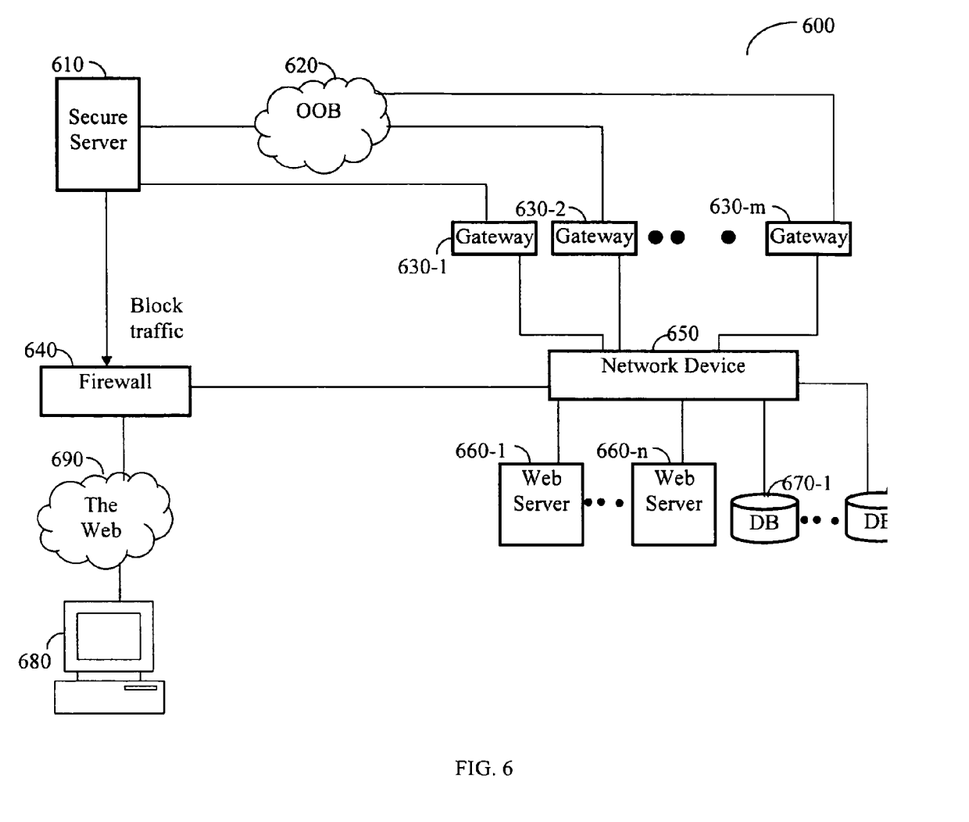
FIG. 6—is a block diagram of an application level security system that discloses an exemplary embodiment of the present invention.

In one embodiment of the present invention the encryption gateway disclosed herein may be integrated in an application level security system. FIG. 6 shows an exemplary security system 600 that comprises a plurality of secure gateways 630-1 through 630-*m* connected to a secure server 610. The secure gateways 630 may be connected to secure server 610 through a conventional network or through an out-of-band (OOB) network 620 for transferring traffic over a dedicated and secured network that is completely separated from the production traffic. A secure gateway 630 is placed on each network segment that is coupled to the web servers 660-1 through 660-*n* and the database servers 670-1 through 670-*r* to be protected.

Secure gateways 630 are configured to operate in the line of traffic. Each secure gateway 630 processes incoming application requests, which are sent as application events to the secure server 610. In accordance with this embodiment, secure gateways 630 are capable of transparently encrypting and decrypting data as discussed in greater detail above. Furthermore, each gateway 630 includes at least a SQL normal behavior profile (NBP) of the database servers 670. A method for generating a NBP of a protected entity (e.g., DB server) may be found in U.S. patent application Ser. No. 10/991,467 titled "A Dynamic Learning Method and Adaptive Normal Behavior Profile (NBP) Architecture for Providing Fast Protection of Enterprise Applications" assigned to common assignee and which is hereby incorporated by reference for all that it contains. A SQL NBP may include, but is not limited to, a list of source IP addresses, a list of client applications, a list of database accounts, a list of tables and views, a list a SQL query, and so on. The SQL NBP further comprises a list of queries and tables that include sensitive information. By utilizing the SQL NBP the processing time required for identifying fields that includes sensitive information is significantly reduced. This can be achieved, for example, by using a fast lookup table of those queries or tables that are known not have sensitive information in them.

Other aspect of the disclosed teachings is a computer program product including a machine-readable media comprising instructions. The instructions are capable of enabling a computer to implement the techniques described above. It should be noted that the machine-readable media could be any media from which a computer can receive instructions, including but not limited to hard disks, RAMs, ROMs, CDs, magnetic tape, internet downloads, carrier wave with signals, etc. Also instructions can be in any form including source code, object code, executable code, and in any language including higher level, assembly and machine languages. The computer system is not limited to any type of computer. It could be implemented in a stand-alone machine or implemented in a distributed fashion, including over the internet.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for transparently encrypting sensitive information flowing from at least a client to a database server over a network, comprising:
    detecting at least one literal of a database command that includes sensitive information at an encryption gateway placed on a segment of the network between the at least a client and the database server;
    extracting the literal from the database command;
    encrypting the literal thereby forming an encrypted string; and
    replacing the literal by the encrypted string in the database command.

2. The method of claim 1, further comprising:
    sending the database command with the encrypted literal to a database server.

3. The method of claim 1, wherein the database command is sent from a client to a database server over network.

4. The method of claim 1, wherein the network comprises at least one of a wide area network (WAN) and a local area network (LAN).

5. The method of claim 1, wherein the database command comprises at least one of executing a database query; preparing a SQL statement; executing a prepared SQL statement; declaring a database cursor; opening a database cursor; and executing a database stored procedure.

6. The method of claim 1, wherein the encryption is done using a size preserving encryption scheme that ensures that the encrypted literal's size is exactly as a size of the extracted literal.

7. The method of claim 6, wherein encrypting the literal comprises:
    forming an encrypted field having a same size as the size of the execrated literal;
    constructing a sensitive stream; and
    encrypting the sensitive stream using a block cipher algorithm.

8. The method of claim 7, wherein the encrypted field comprises:
    a start sentinel cell, a sensitive information pattern identifier cell, a text length cell, and a cipher text cell.

9. The method of claim 7, wherein the sensitive stream comprises:
    a random number, a compressed value corresponding to the extracted literal, padding bits, and a checksum value.

10. The method of claim 9, wherein the compressed value is generated by mapping characters of the extracted literal to a shortest available fixed-size bit representation using a character conversion table of the sensitive information pattern.

11. The method of claim 7, wherein the block cipher algorithm comprises at least one of data encryption standard and an advanced encryption standard.

12. The method of claim 1, wherein the encryption of sensitive information is performed inline.

13. A computer program product including non-transitory computer-readable medium, the computer-readable medium comprising software instructions operable to enable a computer to perform a function of transparently encrypting sensitive information flowing from at least a client to a database server over a network, the instructions comprising instructions for:
    detecting at least one literal of a database command that includes sensitive information at an encryption gateway placed on a segment of the network between the at least a client and the database server;
    extracting the literal from the database command;
    encrypting the literal thereby forming an encrypted string; and
    replacing the literal by the encrypted string in the database command.

14. The computer program product of claim 13, further comprising:
    sending the database command with the encrypted literal to a database server.

15. The computer program product of claim 13, wherein the query is sent from a client to a database server over a network.

16. The computer program product of claim 13, wherein the network comprises at least one of a wide area network (WAN) and a local area network (LAN).

17. The computer program product of claim 13, wherein the database command comprising at least one of executing a database query; preparing a SQL statement;
    executing a prepared SQL statement; declaring a database cursor; opening a database cursor;
    executing a database stored procedure.

18. The computer program product of claim 13, wherein the encryption is done using a size preserving encryption scheme that ensures that the encrypted literal's size is exactly as the extracted literal's size.

19. The computer program product of claim 18, wherein encrypting the literal comprises:
    forming an encrypted field having a same size as the size of the extracted literal;
    constructing a sensitive stream; and
    encrypting the sensitive stream using a block cipher algorithm.

20. The computer program product of claim 19, wherein the encrypted field comprises: a start sentinel cell, a sensitive information pattern identifier cell, a text length cell, and a cipher text cell.

21. The computer program product of claim 19, wherein the sensitive stream comprises: a random number, a compressed value corresponding to the extracted literal, padding bits, and a checksum value.

22. The computer program product of claim 21, wherein the compressed value is generated by mapping characters of the extracted literal to the shortest available fixed-size bit representation using a character conversion table of the sensitive information pattern.

23. The computer program product of claim 19, wherein the block cipher algorithm comprises at least one of a data encryption standard and an advanced encryption standard.

24. The computer program product of claim 13, wherein the encryption of sensitive information is performed inline.

25. A method for transparently decrypting at least a literal of a database command previously identified as sensitive information flowing between a database server and at least a client over a network, comprising:
    for each encrypted literal of a database command included in data retrieved by the at least a client from the database server:
    checking against a predefined policy if a client requesting the data is authorized to view sensitive information contained in the data at an encryption gateway placed on a segment of the network between the at least a client and the database server;
    decrypting the encrypted literal of a database command to construct the sensitive information of the database command if the client is authorized to view the sensitive information contained in the data; and
    sending the constructed sensitive information to the client.

26. The method of claim 25, further comprising:
    blocking a connection with the client, if the client is unauthorized to view the sensitive information.

27. The method of claim 25, wherein the predefined policy determines at least the information and attributes that the client is authorized to view.

28. The method of claim 25, wherein the encrypted literal comprises an encrypted field.

29. The method of claim 28, wherein the encrypted field includes a start sentinel cell, a sensitive information pattern identifier cell, and a text length cell.

30. The method of claim 29, wherein decrypting the encrypted string further comprising:
    identifying the start sentinel cell in the encrypted stream;
    obtaining a value of the text length cell;
    comparing the text length's value to a length of a ciphered text in the ciphered text cell; and
    decrypting the ciphered text.

31. The method of claim 30, further comprising:
    extracting the sensitive information pattern identifier from the sensitive information pattern identifier cell; and
    decoding the unencrypted text according to the character conversion table corresponding to the sensitive information pattern.

32. A computer program product including a non-transitory computer-readable medium comprising software instructions operable to enable a computer to perform a method for transparently decrypting at least a literal of a database command previously identified as sensitive information flowing between a database server and at least a client over a network, the method comprising:
    for each encrypted literal of a database command included in data retrieved by the at least a client from the database server:
    checking against a predefined policy if a client requesting the data is authorized to view sensitive information contained in the data at an encryption gateway placed on a segment of the network between the at least a client and the database server;
    decrypting the encrypted literal of the database command to construct the sensitive information of the database command if the client is authorized to view the sensitive information of the database command; and
    sending the constructed sensitive information to the client.

33. The computer program product of claim 32, further comprising:
    blocking a connection with the client, if the client is unauthorized to view the sensitive information.

34. The computer program product of claim 32, wherein the predefined policy determines at least the information and attributes that the client is authorized to view.

35. The computer program product of claim 32, wherein the encrypted string comprises an encrypted field.

36. The computer program product of claim 35, wherein the encrypted field includes a start sentinel cell, a sensitive information pattern identifier cell, and a text length cell.

37. The computer program product of claim 36, wherein decrypting the encrypted string further comprising:
    identifying the start sentinel cell in the encrypted stream;
    obtaining a value of the text length cell;
    comparing the text length's value to a length of a ciphered text in the ciphered text cell; and
    decrypting the ciphered text.

38. The computer program product of claim 37, further comprising:
    extracting the sensitive information pattern identifier from the sensitive information pattern identifier cell; and
    decoding the unencrypted text according to the character conversion table corresponding to the sensitive information pattern.

39. A secure database system, comprising:
    a database server for servicing requests from clients for computational or data storage resources;
    a database coupled to the database server and operable to save sensitive information; and
    an encryption gateway installed between the clients and the database server and operable to perform transparent encrypting of at least a literal of a database command that contains sensitive information.

40. The system of claim 39, wherein the encryption gateway is further operable to decrypt the sensitive information.

41. The system of claim of claim 40, wherein the encryption gateway is placed on a network segment between the clients and the database server.

42. The system of claim 41, wherein the network is at least one of: a wide area network (WAN) and a local area network (LAN).

43. The system of claim 39, wherein during transparently encrypting the sensitive information of the database command comprises:

extraction of the literal from the database command, encrypt the literal to form an encrypted string and replace the literal by the encrypted string in the database command.

44. The system of claim 39, wherein during transparently decrypting the sensitive information of the database command, the system is operable to check against a predefined policy for each encrypted literal included in data retrieved from the database, wherein the system is operable to check if a client requesting the data is authorized to view sensitive information which is part of the data, wherein the system is operable to decrypt the encrypted literal of the database command to construct the sensitive information if the client is authorized to view the encrypted information and send the constructed sensitive information to the client.

45. The system of claim 44, the system is further operable to blocking a connection with the client, if the client is unauthorized to view the sensitive information.

* * * * *